United States Patent
Landry et al.

(10) Patent No.: US 6,196,744 B1
(45) Date of Patent: Mar. 6, 2001

(54) METHOD AND APPARATUS FOR REPAIRING PLASTIC PARTS

(75) Inventors: William J. Landry, Lee, NH (US); George M. Donovan, Alfred, ME (US)

(73) Assignee: Textron Automotive Company, Dover, NH (US)

( * ) Notice: Subject to any disclaimer, the term of this patent is extended or adjusted under 35 U.S.C. 154(b) by 0 days.

(21) Appl. No.: 09/367,652

(22) PCT Filed: Feb. 12, 1998

(86) PCT No.: PCT/US98/02018

§ 371 Date: Nov. 5, 1999

§ 102(e) Date: Nov. 5, 1999

(87) PCT Pub. No.: WO98/35549

PCT Pub. Date: Aug. 20, 1998

Related U.S. Application Data

(60) Provisional application No. 60/038,089, filed on Feb. 18, 1997.

(51) Int. Cl.[7] .......................... A01K 63/04; A01K 63/06; B32B 35/00; B05D 1/28
(52) U.S. Cl. .......................... 401/198; 401/206; 427/140; 427/429
(58) Field of Search .................................. 401/206, 198; 427/140, 429, 322; 118/264, 266; 156/94

(56) References Cited

U.S. PATENT DOCUMENTS

| | | | |
|---|---|---|---|
| 3,377,124 | * 4/1968 | Matsumoto | 401/206 |
| 4,596,848 | * 6/1986 | Speer | 427/140 |
| 4,948,443 | * 8/1990 | Speer | 427/140 |
| 5,082,386 | * 1/1992 | Hironaka et al. | 401/206 |
| 5,248,521 | 9/1993 | Yamane et al. . | |
| 5,399,373 | 3/1995 | Mrozinski . | |
| 5,470,605 | * 11/1995 | Lundeen | 427/140 |
| 5,470,609 | 11/1995 | Leach et al. . | |
| 5,480,250 | * 1/1996 | Birden | 401/199 |

\* cited by examiner

*Primary Examiner*—Charles R. Eloshway
(74) *Attorney, Agent, or Firm*—Reising, Ethington. Barnes, Kisselle, Learman & McCulloch, PC

(57) ABSTRACT

A method and apparatus for eliminating blemishes in the outer surface of a plastic member of a particular color and wherein such blemishes are removed by using an applicator device provided with a one-component, water-borne material of the same color and having a fibrous tip which is capable of being saturated with the water-borne material.

10 Claims, 1 Drawing Sheet

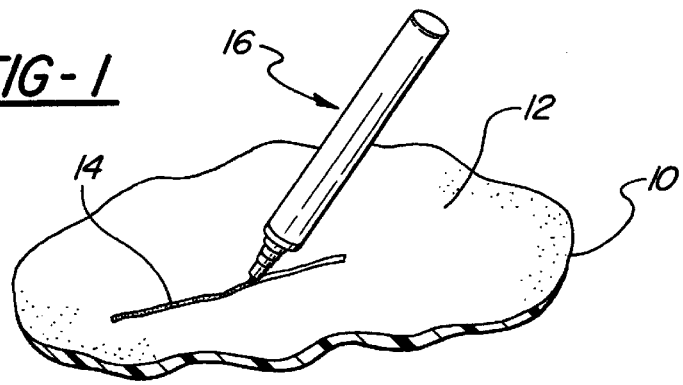
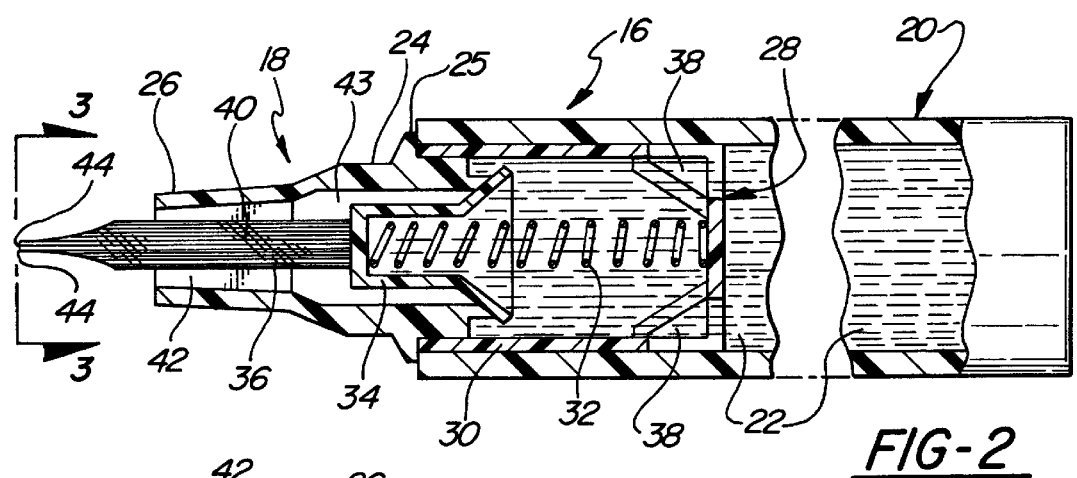
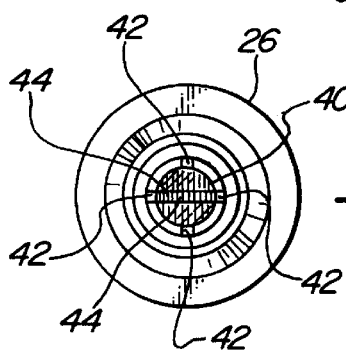
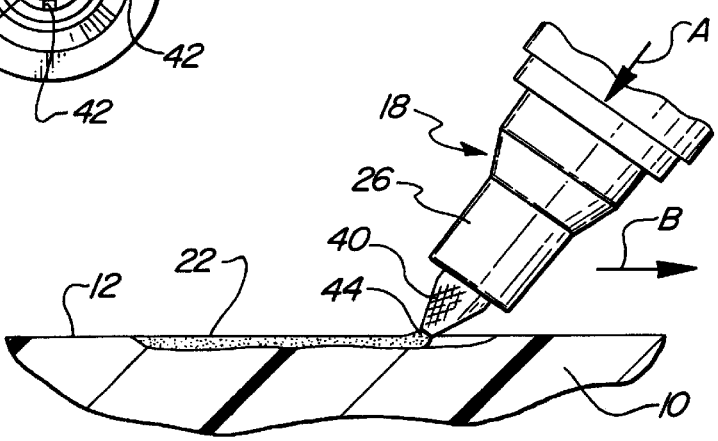

METHOD AND APPARATUS FOR REPAIRING PLASTIC PARTS

This application is based on U.S. Provisional Application Serial No. 60/038,089 filed on Feb. 18, 1997.

This invention concerns a method and apparatus for repairing the surfaces of plastic parts such as, for example, may be present in the interior of an automobile or in other locations.

BACKGROUND

Various parts of an automobile are manufactured as a hard plastic member or are provided with an outer plastic skin or sheet, which serves to cover a substrate with a foam material therebetween. In either case, the outer surface of the plastic part serves as a wear surface as well as a surface that is aesthetically attractive. In the manufacture of such parts, at times the outer or appearance surface of the plastic member may be scratched or scuffed or have a slight discoloration which causes the part to be rejected during final inspection and, as a result, discarded. Obviously, if such part could be repaired and saved, the overall cost of manufacture could be reduced.

SUMMARY OF THE INVENTION

In order to prevent finished plastic parts from being rejected and discarded because of blemishes of the type described above, we have found, after much experimentation, that by using a specially developed applicator device in a predetermined manner, such blemishes can be concealed to the naked eye. This allows the part to be salvaged and used as original equipment for a new automobile.

In this regard, the applicator used for realizing this achievement, takes the form of a pen and includes a dispenser assembly connected to a tubular member that serves as a reservoir containing a filler/coating material preferably made of a liquefied one-component, water-borne vinyl. For the purposes of this specification, a one-component, water-borne material has at least one polymer dispersed in water as the primary carrier. Water is the primary carrier where its percentage by weight is greater than that of any other carrier in which the polymer(s) may be dispersed, or where water is the only carrier. In this instance, the preferred polymer is vinyl. More specifically, the dispenser assembly has an outer housing that includes a cylindrical body portion that serves as the reservoir for the filler/coating material. A fluid control device is located within the dispenser assembly and includes a spring-biased valve which is normally in a closed position. In addition, the dispenser assembly includes a dispenser tip made of a fibrous material that is slidably supported within the assembly. In order to saturate the dispenser tip with the filler/coating material so that the applicator device can be used according to the present invention, the dispenser tip must be moved inwardly so as to cause the rear end of the dispenser tip to unseat the valve. This is accomplished by manually holding the applicator device by its tubular body and forcibly pressing the dispenser tip against the blemish in the plastic surface being repaired.

In order to repair the blemish in the appearance surface of a plastic member in accordance with the present invention, the blemish is first cleaned using a lint-free clean cloth moistened with a cleaning fluid such as isopropyl alcohol if the plastic member is made of polyvinyl chloride (PVC). If the plastic member is made of thermoplastic olefin (TPO), thermoplastic urethane (TPU), acrylonitrile-butadiene styrene (ABS), or thermoplastic elastomers (TPE), the cleaning fluid would be a 50/50 mixture of methyl ethyl ketone/toluol (MEK/Toluol). Toluol is also known as toluene. After cleaning the repair area, the plastic member is allowed to air dry. If the plastic member is made of TPO, TPU, TPE or ABS, an adhesion promoter will first need to be applied to the blemish. If the plastic material is PVC, the adhesion promoter need not be applied. Afterwards, the applicator device is used for filling in the blemish with the filler/coating material by first positioning the dispenser tip at one end of the blemish. Downward pressure is then applied to the applicator device to cause the spring-biased valve to open and cause the filler/coating material to flow into the body of the tip. The applicator device is moved along the blemish permitting the filler/coating material to cover and conceal it. Afterwards, the filler/coating material is cured at a room temperature before the plastic member is released for production use.

Accordingly, one object of the present invention is to provide a new and improved method and apparatus for repairing the appearance surface of a plastic part that may have undesirable chips, scuffs, scratches, mars, stains, or localized discoloration.

Another object of the present invention is to provide a new and improved method and apparatus for eliminating blemishes in the outer surface of a plastic sheet of a particular color that covers a part and wherein such blemishes are removed by using an applicator device provided with a one-component, water-borne vinyl material of the same color as the particular color and having a fibrous tip which is capable of being saturated with the water-borne vinyl material.

A further object of the present invention is to provide a new and improved method and apparatus which takes the form of a pen having a plastic reservoir containing a liquefied coating/filling material and being selectively conveyed to an applicator tip made of an acrylic fiber material having a density which allows the liquid material to flow through the tip at a desired rate onto the skin while the tip is manually pressed against the outer surface of a plastic sheet so as to fill and repair the damaged area of such surface.

A still further object of the present invention is to provide a new and improved method and apparatus for repairing the outer surface of a plastic member by using a one-component, water-borne vinyl material which is applied to the damaged area through a pen type device having a reservoir containing the one-component, water-borne material that is selectively fluidly connected to a spring biased dispenser tip upon being manually pressed into engagement with the damaged area so as to cause the water-borne material to flow from the reservoir and through the dispenser tip to fill and repair the damaged area of the plastic member.

BRIEF DESCRIPTION OF THE DRAWINGS

The above and other objects, features and advantages of the present invention will be more apparent from the following detailed description when taken with the drawing in which:

FIG. 1 is a pictorial view showing an applicator device specially made for practicing the present invention and being used to repair a scratch located in the outer appearance surface of a plastic member;

FIG. 2 is a cross-sectional view of the applicator device seen in FIG. 1;

FIG. 3 is an end view of the guide section of the dispenser assembly of the applicator device taken on line 3—3 of FIG. 2; and FIG. 4 is an enlarged elevational view showing the dispenser tip pressed against the outer surface of the plastic member to release the liquefied filler/coating material within the applicator device so as to fill and conceal the cavity created by the scratch seen in FIG. 1.

DETAILED DESCRIPTION OF THE PREFERRED EMBODIMENT

Referring to the drawing and more particularly FIG. 1 thereof, a plastic member 10 is shown which can be either a hard plastic member or a flexible cover sheet or skin of an automobile interior trim panel or instrument panel or an exterior trim panel or bumper. The cover sheet can be made of polyvinyl chloride (PVC), thermoplastic olefin (TPO), thermoplastic urethane (TPU), acrylonitrile-butadiene styrene (ABS), or thermoplastic elastomers (TPE). This listing of plastic materials is intended to be illustrative, and not exhaustive. With regard to forming methods, the plastic member 10 may be produced by any plastic forming method known in the art.

The plastic member 10 has an outer appearance surface 12 which in this instance has a scratch 14 of a depth and type which would render the automobile part formed with this cover sheet to be aesthetically unacceptable. In this instance, however, by utilizing an applicator device 16 and a method of repair according to the present invention, the scratch 14 can be concealed so as not to be readily visible to an observer.

As seen in FIG. 2, the applicator device 16 takes the form of a pen and includes a dispenser assembly 18 connected to a tubular member 20 which serves as a reservoir containing a filler/coating material 22 to be described more fully hereinafter.

More specifically, the dispenser assembly 18 has an outer housing which includes a cylindrical body portion 24 the outer periphery of which is integrally formed with annular collar 25. The rear end of the cylindrical body portion 24 extends (as limited by the collar 25) into the front open end of the tubular member 20 and is sealingly secured thereto. The front portion of the outer housing tapers inwardly from body portion 24 and is integrally formed as a cylindrical guide section 26 of a reduced diameter. Also, a fluid control device 28 is rigidly supported by and located within the cylindrical body portion 24 and includes a cylindrical housing 30 having an inner chamber containing a spring 32 biasing a valve 34 into a closed position relative to a circular opening 36 centrally formed in the front end of the housing 30. A plurality of elongated identical apertures or holes 38 (two of which are only shown in FIG. 2) are provided around the housing 30 adjacent the rear end thereof. The apertures 38 provide communication between the reservoir formed in the tubular member 20 and the interior of the housing 30 of the fluid control device 28. In addition, the dispenser assembly 18 includes a dispenser tip 40 which is made of a fibrous material and is slidably supported within the guide section 26 of the dispenser assembly 18 by radially inwardly extending and circumferentially spaced projections 42 as seen in FIG. 3. The projections 42 extend longitudinally along the length of the guide section 26 and provide passages therebetween for fluid connection with a chamber 43 located adjacent the rear end of the dispenser tip 40. The portion of the dispenser tip 40 located within the guide section 26 of the dispenser assembly 18 is generally cylindrical in cross section with the front exposed end of the dispenser tip 40 being generally rectangular in cross section of a gradually decreasing size so as to present a pair of spaced parallel straight edges 44 at its terminal end.

The filler/coating material 22 located within the reservoir of the applicator device 16 will normally substantially fill the interior of the housing 30 of the flow control device 28 by flowing thereto through the apertures 38. In order to saturate the dispenser tip 40 with the filler/coating material 22 so that the applicator device 16 can be used according to the present invention, the dispenser tip 40 must be moved inwardly within the guide section 26 so as to cause the rear end of the dispenser tip 40 to unseat the valve 34 relative to the opening 36. This can be accomplished by having a person manually hold the applicator device 16 by its tubular body 20 and forcibly pressing the dispenser tip 40 against the plastic surface 12 being repaired. This action causes the dispenser tip 40 to move further into the guide section 26 of the dispenser assembly 18 so that the rear end of the dispenser tip 40 unseats the valve 34 against the bias of the spring 32. This then allows the filler/coating material 22 within the housing 30 to flow downwardly into the chamber 43 and then along the passages between the projections 42 into the fibrous body of dispenser tip 40 and finally flow outwardly from the edges 44 onto the surface being repaired.

The tubular member 20, body portion 24 including the guide section 26, and the housing 30 are made of a plastic material and are provided by Mohawk Wood Coatings Group, located at 47158 STHwy 30, Amsterdam, N.Y. 12010-7417. The dispenser assembly 18 carries a code identifying number of QO5-0017-001 and is made by Flocon Inc. located at 111 Lions Drive, Barrington, Ill. 60010. The dispenser tip 40 is made of an acrylic fiber and is identified by the code number Q10-0210-076 and the tubular member 20 is identified by code number BPN V2. Both the dispenser tip 40 and the tubular member 20 are also supplied by Flocon Inc.

The filler/coating material 22 preferably used with the applicator device 16 is manufactured by Westfield Coatings Corporation, 221 Union St., P.O. Box 815, Westfield, Mass. 01086 and is a one-component, water-borne vinyl material. The filler/coating material 22 comes in different colors which will match identically the various colors of the plastic members that are presently being manufactured. Thus, when repairing a plastic member, the final color of the filler/coating material 22 will be identical to the color of the plastic member.

For example, if the plastic member 10 seen in FIG. 1 is identified as having the color "lapis blue", then the particular filler/coating material selected for repairing the scratch 14 in the plastic member 10 and having the corresponding color would be the Westfield filler/coating material identified by product code 332WSL23747. However, prior to this particular water-borne vinyl material being placed into the reservoir of the applicator device 16, it would first have to be diluted to obtain the proper viscosity which allows the filler/coating material to flow at an acceptable rate through the fibrous tip 40 and onto the surface 12 being repaired. After much experimentation, it has been found that the viscosity of the Westfield filler/coating material having the above product code must be reduced approximately ten percent by adding water to the material.

In order to obtain the proper viscosity of the above identified Westfield filler/coating material for use in the applicator device 16, a viscosity measuring instrument was used that is made and sold by Paul N. Gardner Company, Inc., 316 NE 1st St., Pompano Beach, Fla. 33060, and complies with the requirements of ASTM D 4212. The instrument used is known as EZ Dip Viscosity Cup Series. The series consist of five cups, Numbers 1–5, and the particular EZ cup used for determining the proper viscosity of the Westfield filler/coating material was the EZ cup No. 2. Using this cup, it was found that the preferable and acceptable viscosity of the Westfield filler/coating material was realized when the first break in the efflux stream occurred between 16 and 20 seconds at a temperature of about 70 degrees Fahrenheit plus or minus two degrees.

In practicing the method according to the present invention for repairing the scratch 14 in the plastic member 10 as seen in FIG. 1, the following is required:

1. Adhesion Promoter HP-21054-4w1 made by Morton International Inc. located at 2700 E. 170th Street, Lansing, Ill. 60433-1107.
2. The applicator device 16 described above.
3. Isopropyl Alcohol and MEK/Toluol (50/50%).
4. Lint Free Cloth (Technical cloth 11 made by The Texwipe Company, located at Upper Saddle River, N.J. 07458.

With reference to FIG. 4, the procedure for repairing the scratch 14 in the appearance surface 12 of the plastic member 10 is as follows:

First clean the repair area with a clean cloth of the above type using an appropriate recommended cleaner and applying moderate pressure and a wiping motion. If the plastic member is made of PVC, the cleaning fluid used would be the isopropyl alcohol. If the plastic member is made of TPO, TPU, TPE or ABS, the cleaning fluid would be the 50/50 mixture of MEK/Toluol.

After cleaning the repair area, flash (air dry) the plastic member for a minimum of 30 seconds at a room temperature of approximately 72 degrees Fahrenheit. If the plastic member is made of TPO, TPU, TPE or ABS, the Morton adhesion promoter identified above will first need to be applied to the scratch 12 and be cured as recommended by Morton. At a room temperature of approximately 72 degrees Fahrenheit, the cure time for the Morton adhesion promoter has been found to be about twenty minutes. If the plastic material is PVC, the Morton adhesion promoter need not be applied. Afterwards, the applicator device 16 will now be used for filling in the scratch 12 with the filler/coating material 22. Before proceeding to use the applicator device 16, first manually shake the applicator device 16 up and down for about 30–60 seconds so as to cause a metal ball within the reservoir of the tubular member 20 to mix the filler/coating material. Then position the applicator device 16 so that one of the wide straight edges 44 of the dispenser tip 40 lays flat on the surface 12 and spans the scratch 14. While applying a manual downward pressure on the applicator device 16 in the direction of the arrow "A" to cause the valve 34 to open and cause the filler/coating material 22 to flow into the body of the tip 40, the applicator device 16 is moved in the direction of the arrow "B" from the left hand beginning-point of the scratch 14 towards the right hand end-point of the scratch 14 permitting the filler/coating material 22 to fill and cover the scratch 14. After filling in the scratch 14 a cure time of twenty minutes at a room temperature of approximately 72 degrees Fahrenheit will be required before the plastic member 10 can be released for production use. By using the above applicator device 16 in the manner described, it has been found that the repair area will meet Ford Motor Company specification ESA-M99J263-A. If for some reason, the procedure described above needs to be repeated because the repair was not performed properly, the filler/coating material 22 deposited onto the surface 12 can be removed using the above identified isopropyl alcohol mixture.

Although the present invention has been described in connection with a flexible plastic sheet or skin covering an automobile part such as a trim panel or an instrument panel, it will be understood that the plastic member can take the form of a hard plastic or flexible plastic part such as found in furniture, sitting structures, or any other plastic part which may not be used in an automobile. Also, it will be understood that the dispenser tip 40 must be made of a fibrous material which has sufficient rigidity to withstand the downward pressure applied for opening the valve 34 while at the same time having sufficient porosity and density of a type which will allow the filler/coating material 22 to flow through the body of the dispenser tip 40 and to the terminal end of the tip 40 for applying a uniform coating on the damaged area of the plastic member. In addition, depending upon the depth of the scratch, the applicator device 16 may need to make more than one pass along the repair area to fill the scratch and conceal the damaged area.

Various changes and modifications can be made in the apparatus and method disclosed herein without departing from the spirit of the invention. Such changes and modifications are contemplated by the inventors and they does not wish to be limited except by the scope of the appended claims.

What is claimed is:

1. A method of eliminating blemishes such as chips, scuffs, scratches, and localized discolorations in the outer surface of a plastic member of a particular color by using a hand-held self-contained applicator having a body portion and a fibrous tip at one end thereof comprising the steps of:

a. providing a one-component, water-borne vinyl material of the same color as said particular color;

b. adjusting the viscosity of said water-borne vinyl material so as to allow said water-borne vinyl material to flow at an acceptable rate through said fibrous tip;

c. placing said water-borne vinyl material into said body portion of said applicator;

d. selecting said part having a blemish;

e. cleaning said blemish with a cloth moistened with a cleaning fluid in a manner that leaves some of said cleaning fluid deposited on said blemish;

f. allowing said cleaning fluid deposited on said blemish to dry;

g. forcibly pressing said fibrous tip against said blemish so as to open a valve and release said water borne material from said body portion to permit said water-borne vinyl material to fill the fibrous tip of said applicator with said water-borne vinyl material;

h. moving said fibrous tip along said blemish so that said water-borne vinyl material flows onto said outer surface of said plastic member and completely covers said blemish; and i. allowing said water-borne vinyl material to cure and conceal said blemish.

2. The method set forth in claim 1 wherein said plastic member is made of polyvinyl chloride.

3. The method set forth in claim 2 wherein said cleaning fluid is isopropyl alcohol.

4. The method set forth in claim 1 wherein said cleaning fluid is a 50/50 mixture of MEK/Toluol.

5. The method set forth in claim 4 wherein an adhesive promoter is deposited onto said blemish after said cleaning fluid deposited on said blemish has dried.

6. The method set forth in claim 5 wherein said plastic member is made of thermoplastic olefin.

7. The method set forth in claim 5 wherein said plastic member is made of acrylonitrile-butadiene styrene.

8. The method set forth in claim 5 wherein said plastic member is made of thermoplastic elastomer.

9. A method of eliminating blemishes such as chips, scuffs, scratches, and localized discolorations in the outer surface of a plastic member made of polyvinyl chloride of a particular color by using a hand-held self-contained applicator device having a body portion and a fibrous tip at one end thereof that allows water-borne vinyl material to flow into said tip when pressure is applied thereto comprising the steps of:

a. providing a one-component, water-borne vinyl material of the same color as said particular color;
 b. adjusting the viscosity of said water-borne vinyl material so as to allow said water-borne vinyl material to flow at an acceptable rate through said fibrous tip;
 c. placing said water-borne vinyl material into said body portion of said applicator;
 d. selecting said plastic member having a blemish;
 e. wiping the blemish with a cloth moistened with an alcohol based cleaning fluid so as to clean said blemish while leaving some of the cleaning fluid deposited on said blemish;
 f. allowing said cleaning fluid deposited on said blemish to dry;
 g. forcibly pressing the fibrous tip of said applicator device against the blemish so as to open a valve and release said water-borne vinyl material from said body portion of said applicator and cause the water-borne vinyl material to flow into said fibrous tip;
 h. moving said fibrous tip along said blemish so that was water-borne vinyl material flows onto said outer surface of said plastic member and completely covers said blemish; and
 i. allowing said water-borne vinyl material to cure and conceal said blemish.

10. A method of eliminating blemishes such as chips, scuffs, scratches and localized discolorations in the outer surface of a plastic member of a particular color by using an hand-held self-contained applicator having an elongated plastic body portion and a fibrous tip at one end thereof that allows water-borne vinyl material to flow into said tip when pressure is applied thereto comprising the steps of:

a. providing a one-component, water-borne vinyl material of the same color as said particular color,
 b. adjusting the viscosity of said water-borne vinyl material so as to allow said water-borne vinyl material to flow at an acceptable rate through said fibrous tip;
 c. placing said water-borne vinyl material into said body portion of said applicator;
 d. providing a plastic member having one of said blemishes and made of a material selected from the group consisting of thermoplastic olefin, thermoplastic urethane, acrylonitrile-butadiene styrene and thermoplastic elastomer;
 e. wiping the blemish with a cloth moistened with a cleaning fluid in the form of a 50/50 mixture of MEK/Toluol so as to clean said blemish while leaving some of the cleaning fluid deposited on said blemish;
 f. applying an adhesive promoter onto said blemish after said cleaning fluid on said blemish has dried;
 g. pressing the fibrous tip of said applicator against the blemish so as to open a valve and release said water-borne vinyl material from said body portion and permit said water-borne material to flow into said fibrous tip;
 h. moving said fibrous tip along said blemish so that said water-borne vinyl material flows onto said outer surface of said plastic member and completely covers said blemish; and
 i. allowing said water-borne vinyl material to cure and conceal said blemish.

* * * * *